United States Patent [19]

Cochran et al.

[11] 3,717,068
[45] Feb. 20, 1973

[54] ROCKET LAUNCHER

[75] Inventors: David L. Cochran, Danville; Steven J. Salter, Walnut Creek, both of Calif.

[73] Assignee: MB Associates

[22] Filed: Aug. 5, 1970

[21] Appl. No.: 61,102

[52] U.S. Cl. ............... 89/1.806, 89/1.807, 89/1.816
[51] Int. Cl. .................................................. F41f 3/04
[58] Field of Search ..... 89/1.806, 1.807, 1.816; 42/1, 42/1 Z

[56] References Cited

UNITED STATES PATENTS

| 3,378,944 | 4/1968 | Mainhardt et al. | 42/1 Z |
| 2,867,153 | 1/1959 | Hirsch | 89/1.806 |
| 2,733,699 | 2/1956 | Krinsky | 89/1.806 X |

FOREIGN PATENTS OR APPLICATIONS

| 1,043,875 | 11/1958 | Germany | 89/1.806 |

*Primary Examiner*—Samuel W. Engle
*Attorney*—Harness, Dickey & Pierce

[57] ABSTRACT

The disclosure relates to a hand supported distress flare rocket launcher. The launcher comprises a tubular body having a spring which urges a plunger carrying a firing pin on its forward end into engagement with the ignition cap of a rocket propelled flare mounted at the forward end of the launcher. The forward end of the launcher is provided with gripping fingers which retain the rocket against movement until sufficient gas pressure has been built up to launch and propel the rocket into trajectory.

4 Claims, 3 Drawing Figures

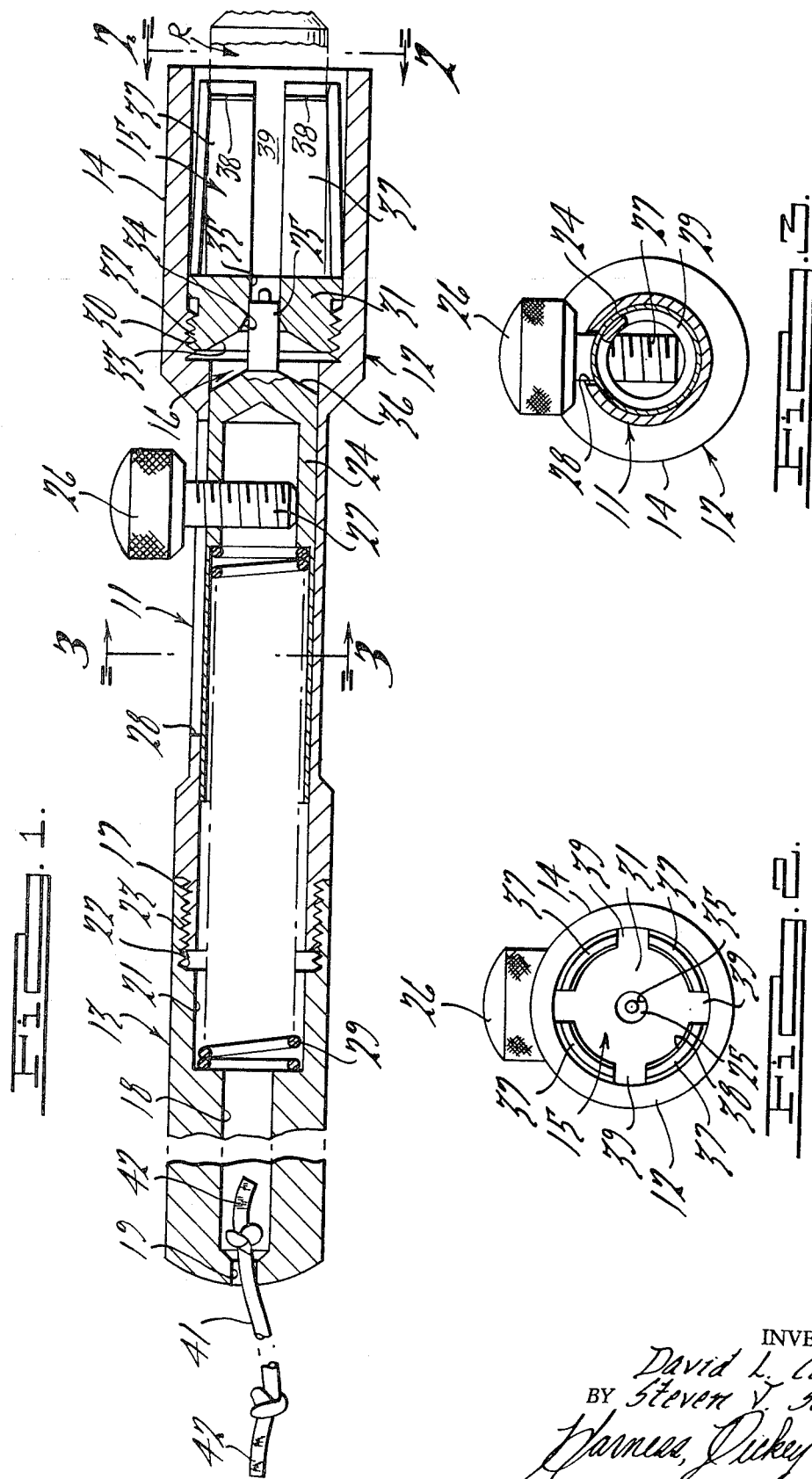

ROCKET LAUNCHER

BACKGROUND OF THE INVENTION

Reference may be had to the U.S. Pat. to Mainhardt et al. No. 3,378,944 for a disclosure of a distress flare launcher which ignites and directs a flare in the same manner as the present device.

RELATED APPLICATION

Reference may be had to the U.S. Pat. application to Mainhardt et al., Ser. No. 746,589, filed July 22, 1968, now abandoned, for "Rocket Launcher" which has features similar to those of the present invention.

SUMMARY OF THE INVENTION

The invention pertains to a rocket retainer comprising a plurality of cantilevered gripping elements which engage the sides of the rocket body to retain it within a tubular rocket receptacle. The rocket is retained against movement after the motor propellant is ignited until sufficient gas pressure builds up to propel the rocket into a desired trajectory.

BRIEF DESCRIPTION OF THE DRAWING

FIG. 1 is a broken sectional view of a rocket launcher embodying features of the present invention;

FIG. 2 is a view of the rocket receiving end of the rocket launcher illustrated in FIG. 1, as viewed from line 2—2 thereof; and FIG. 3 is a sectional view of the structure illustrated in FIG. 1, taken on the line 3—3 thereof.

DESCRIPTION OF THE PREFERRED EMBODIMENT

A rocket launcher 11 comprises a cylindrical housing or rocket receptacle 12 and a handhold portion 13. The rocket receptacle 12 has an enlarged forward end 14 for the acceptance of a flare rocket R. A rocket retainer 15 is disposed in the receptacle 12. The receptacle 12 has a central bore or passage 16 extending therethrough and a rear end portion provided with a thread 17. The handhold portion 13 of the launcher 11 has a central bore 18 which communicates with a smaller bore 19 through one end thereof and a forward portion with a central bore 21 equal in diameter to that of the passage 16 in the receptacle 12 which is disposed in alignment therewith. An open end portion 22 of the handle portion 13 is provided with an internal thread 23 which engages the thread 17 on the housing or receptacle 12 to connect the handhold portion 13 in extension thereof.

A plunger 24 is disposed within the bore 16 of the receptacle 12 for forward and rearward movement therein and has a firing pin 25 on its forward end. An operating knob 26 has a threaded portion 27 extending through a slot 28 in the wall of the receptacle 12 for acceptance in a threaded aperture in the plunger 24. A coil spring 29 is disposed within the bore 16 opposite ends abutting the plunger 24 and the handle portion 13.

The rocket retainer 15 is preferably constructed from stainless steel which is machinable, corrosion resistance, has a high yield point and is heat-treatable. The retainer 15 has a base portion 31 with an external thread 32 thereon for acceptance in a complementary threaded portion 30 of the receptacle 12. The retainer 15 has a conical surface 33 on the bottom end thereof which communicates with a second conical surface 34 axially inwardly thereof and with a central bore 35 through which the firing pin 25 is driven. The conical surface 33 provides clearance for a forward conical surface 36 on the plunger 24 while the inner conical surface 34 tends to guide the end of the firing pin 25 into the bore 35.

In accordance with the present invention, the rocket retainer 15 comprises four fingers 37 which converge radially inwardly and axially outwardly from the enlarged wall portion 14 of the receptacle 12. The fingers 37 have rocket gripping edges 38 which engage the rocket R in arcuate line contact. Four slots 39 between the four fingers 37 permit relative movement therebetween and also permit the gas to escape therebetween. With this construction, an inward bias is provided by the gripping edges 38 which engage the body of the rocket R intermediate the ends thereof and retain it in the receptacle 12. The fingers 37 retain the rocket R against movement when the rocket motor propellant is ignited until a predetermined pressure has been built up, sufficient to propel the rocket R into trajectory. It is to be noted that the bias of the fingers on the rocket R is essentially uniform arcuate line contact as the rocket moves outwardly of the launcher 11. In this manner, guidance is imparted to the rocket R without disturbing its trajectory.

A lanyard 41 is passed through the openings 18 and 19 after a knot has been tied on the inner end after which a knot is tied on the outer end to retain the lanyard on the handhold portion 13. The lanyard is preferably made from a length of braided nylon cord having seared ends 42 which prevents raveling.

When a flare rocket R is to be fired, the rocket R is inserted within the retainer 15 and forced against the base portion 31 thereof. The knob 26 is pulled downwardly to the bottom of the slot 28. When the knob 26 is released, the spring 29 forces the plunger 24 forwardly and the firing pin 25 strikes the ignition cap (not shown) on the bottom of the rocket R to ignite the propellant thereof, which, as pointed out above, will cause a gas pressure to build up sufficiently to launch the rocket R. The rocket R will propel itself coaxially outwardly of the receptacle 12 during the burning of the rocket propellant, the gas therefrom being expelled in a manner to cause the rocket R to rotate on its axis, as is well known in the art. At a predeterminable flight along the rocket's trajectory, a flare is ignited and a signal provided thereby. As the rocket R is continuously urged by the burning propellant, it will pass through foliage and the like and continue its flight thereabove where the flare is readily visible.

The use of the plurality of equally spaced cantilevered spring fingers 37 to retain the rocket R provides both controllable hold-down force as well as a controllable guiding force during the passage of the rocket from the receptacle 12 of the launcher 11. The hold-down force retains the rocket R in fixed position within the receptacle 12 prior to and during the time the firing pin strikes the ignition cap of the rocket R. As pressure builds up, the rocket R advances against the frictional force between the fingers 37 and the exterior rocket wall as determined by the spring constant thereof. Since the fingers 37 are equally spaced and uniformly stressed, the rocket R will be accurately launched into a desired trajectory.

What is claimed is:

1. In a rocket launcher, a body having a hollow cylindrical rocket supporting end, a cylindrical rocket retainer having its inner end adjacent to the bottom of the hollow cylindrical supporting end, means for securing said retainer within said rocket supporting end, said cylindrical retainer having a portion extending from the secured portion substantially to the outer end of said hollow cylindrical supporting end and having longitudinal slots forming arcuate fingers which converge inwardly away from the inner wall of the hollow cylindrical supporting end, the outer ends of the fingers sloping inwardly forming gripping edges with the inner finger ends for applying a radial inward bias to the cylindrical body of a rocket at points intermediate the ends thereof when said rocket is in the launch position and over a substantial longitudinal portion of the rocket body as it is propelled from the supporting end.

2. In a rocket launcher as recited in claim 1, wherein said secured portion of the retainer forms a bottom for the hollow cylindrical end which is engaged by the rocket when in the launch position.

3. A rocket launcher as recited in claim 1, wherein the outer ends of the fingers have radially inwardly directed terminal gripping portions which engage the rocket body.

4. In a rocket launcher as recited in claim 3, wherein said gripping portions forces the fingers outwardly when a rocket to be fired is inserted between the fingers and forced inwardly into engagement with the bottom portion of the rocket retainer.

* * * * *